(12) United States Patent
Haim Lev

(10) Patent No.: US 7,551,782 B2
(45) Date of Patent: Jun. 23, 2009

(54) SYSTEM AND METHOD OF USER INTERFACE AND DATA ENTRY FROM A VIDEO CALL

(75) Inventor: Zvi Haim Lev, Tel Aviv (IL)

(73) Assignee: DSPV, Ltd., Tel Aviv (IL)

( * ) Notice: Subject to any disclaimer, the term of this patent is extended or adjusted under 35 U.S.C. 154(b) by 246 days.

(21) Appl. No.: 11/353,151

(22) Filed: Feb. 14, 2006

(65) Prior Publication Data
US 2006/0182311 A1     Aug. 17, 2006

Related U.S. Application Data

(60) Provisional application No. 60/652,815, filed on Feb. 15, 2005.

(51) Int. Cl.
*G06K 9/62* (2006.01)

(52) U.S. Cl. ............... 382/209; 382/216; 382/217; 382/218; 382/219

(58) Field of Classification Search ............ 382/209, 382/216, 217, 218, 219
See application file for complete search history.

(56) References Cited

U.S. PATENT DOCUMENTS

| | | | |
|---|---|---|---|
| 5,455,875 A | 10/1995 | Chevion et al. | |
| 5,579,471 A | 11/1996 | Barber et al. | |
| 5,926,116 A | 7/1999 | Kitano et al. | |
| 6,055,536 A | 4/2000 | Shimakawa et al. | |
| 6,192,360 B1 | 2/2001 | Dumais et al. | |
| 6,286,036 B1 | 9/2001 | Rhoads | |
| 6,577,755 B1 | 6/2003 | Lorie | |
| 6,651,053 B1 | 11/2003 | Rothschild | |
| 6,687,421 B1 | 2/2004 | Navon | |
| 6,687,697 B2 | 2/2004 | Collins-Thompson et al. | |
| 6,690,407 B1 | 2/2004 | Parker et al. | |
| 6,753,883 B2 | 6/2004 | Schena et al. | |
| 6,766,363 B1 | 7/2004 | Rothschild | |
| 6,937,766 B1 * | 8/2005 | Wilf et al. | 382/229 |
| 6,947,571 B1 | 9/2005 | Rhoads et al. | |
| 7,058,689 B2 | 6/2006 | Parker et al. | |
| 7,156,311 B2 | 1/2007 | Attia et al. | |
| 2002/0006212 A1 | 1/2002 | Rhoads et al. | |

(Continued)

OTHER PUBLICATIONS

Ismail Haritaoglu, "InfoScoope: Link from Real World to Digital Information Space", Proceedings. Lecture Notes in Computer Science, 2001, pp. 247-255, ISBN 3-540-42614-0, vol. 2201, Ubicomp2001, Ubiquitous Computing, Third International Conference, Atlanta, Georgia, USA.

*Primary Examiner*—Matthew C Bella
*Assistant Examiner*—Mike Rahmjoo
(74) *Attorney, Agent, or Firm*—Sughrue Mion, PLLC

(57) ABSTRACT

A system and method for imaging an object, and using reference templates to recognize and enhance object image, including the identification of a template for a specific area of a target object to which images of the object may be compared, the use of the camera on a wireless device to image the target object, comparison of the images of the object within the specific area of the object to the template for that area of the object, identification of the image of the object from the comparison of the image to the template for the specific area of the object, and the storage of the template and the identified image on a data server.

18 Claims, 8 Drawing Sheets

U.S. PATENT DOCUMENTS

| | | |
|---|---|---|
| 2002/0019784 A1 | 2/2002 | Ritz |
| 2002/0023218 A1 | 2/2002 | Lawandy et al. |
| 2002/0156866 A1 | 10/2002 | Schneider |
| 2003/0012562 A1 | 1/2003 | Lawandy et al. |
| 2003/0072467 A1 | 4/2003 | Brundage et al. |
| 2003/0133423 A1* | 7/2003 | LaDue ...................... 370/330 |
| 2004/0128512 A1 | 7/2004 | Sharma et al. |
| 2005/0050165 A1 | 3/2005 | Hamynen |
| 2005/0129311 A1* | 6/2005 | Haynes et al. .............. 382/170 |

* cited by examiner

SYSTEM AND METHOD OF USER INTERFACE AND DATA ENTRY FROM A VIDEO CALL

CROSS-REFERENCE TO RELATED APPLICATIONS

This application claims the benefit of U.S. Provisional Application Ser. No. 60/652,815, filed Feb. 15, 2005, entitled, "System and method of user interface and data entry from a video call", which is incorporated herein by reference in its entirety.

BACKGROUND OF THE NON-LIMITING EMBODIMENTS OF THE PRESENT INVENTION

1. Field of the Exemplary Embodiments of the Invention

Exemplary embodiments of the present invention generally relate to the field of digital interactive video calls, and their utilization for purposes other than that of person to person video call. Furthermore, exemplary embodiments of this invention are for a system that utilizes present day video call capable equipment, in order to enable a new human interface for data entry, retrieval, and manipulation. The new human interface is based on the user showing the objects that he or she wants to access or manipulate to the camera of the video-call device, and a server on the other end recognizing these objects and taking the appropriate actions. Hence, exemplary embodiments of this invention utilize the video call person to person (P2P) system in order to facilitate a novel kind of person to machine interaction.

Certain definitions are applied throughout this document. These definitions are provided merely to define the terms used in the related art techniques and to describe non-limiting, exemplary embodiments of the present invention. It will be appreciated that the following definitions are not limitative of any claims in any way.

These are the definitions that are applied in this document:

"Computational facility" means any computer, combination of computers, or other equipment performing computations, that can process the information sent by an imaging device. Some examples would be the local processor in the imaging device, a remote server, or a combination of the local processor and the remote server.

"Displayed" or "printed", when used in conjunction with an imaged document, is used expansively to mean that an object to be imaged is captured on a physical substance (as by, for example, the impression of ink on a paper or a paper-like substance, or by embossing on plastic or metal), or is captured on a display device (such as LED displays, LCD displays, CRTs, plasma displays, ATM displays, meter reading equipment or cell phone displays).

"Form" means any document (displayed or printed) where certain designated areas in this document are to be filled by handwriting or printed data. Some examples of forms are a typical printed information form where the user fills in personal details, a multiple choice exam form, a shopping webpage where the user has to fill in details, and a bank check.

"Image" means any image or multiplicity of images of a specific object, including, for example, a digital picture, a video clip, or a series of images.

"Image recognition" means an array of techniques for recognizing various objects in images and video data. These techniques include, among others, optical character recognition (OCR), optical mark recognition (OMR), barcode recognition, alphanumeric data detection, logo and graphical symbols recognition, face recognition, and recognition of special marks.

"Imaging device" means any equipment for digital image capture and sending, including, for example, 3G videophones, a PC with a webcam, a digital camera, a cellular phone with a camera, a videophone, or a camera equipped PDA, video conferencing device, or a personal computer tethered to a camera, or a laptop with 3G modem card.

"Network connectivity" means a connection to a one-to-one or one-to-many data transmission network. Examples of the transmission network to which connectivity might be applied include a wireless 2G or 3G network, the Internet, an Ethernet network, and a private data network (for say security purposes). The connectivity could be achieved in any number of ways, including, for example, wireless communication, cable, an Infrared connection, Bluetooth, a USB connection, a Firewire connection, or a WiFi link.

"User" refers to the imaging device user. The imaging device user may be a human user, or an automated or semi-automatic system. Such a system could be, for example, a security system, which could be fully automated (meaning without direct human intervention) or semi-automatic (meaning that the system would be tied directly to specific people or to specific functions conducted by humans).

"Video call" means two-way and one-way video calls, including, for example, calls performed via computers with web-cams. Any connection performed by an imaging device with a data connection and with video capture and sending capabilities, could be included with the definition of "video call". The video call is performed from a user to a computational facility, which takes actions according to the video data.

"Video data" is any data that can be encapsulated in a video format, such as a series of images, streaming video, video presentation, or film.

2. Description of the Related Art

Present day digital data networks allow for a variety of different methods for performing a video call from a fixed, tethered, or mobile device. Some typical examples are:

EXAMPLE 1

A physically static, fixed video conferencing system conducting a video call, for example video communication system in a conference room of a corporation. Typical equipment for such calls is made by companies such as Polycom™, Accord Networks™, Vcon™, and Radvision™. The video call is conducted over wireline networks using the IP protocol, RTP based protocols (such as H.323, H.321, and H.324), and video compression codecs (such as MPEG4, H.263, and H.264).

EXAMPLE 2

A personal "web camera" tethered (or connected wirelessly, or by cable, Infrared, Bluetooth, USB, or a WiFi link) to a Personal Computer/workstation, and conducting a video call where the PC is connected to the Internet. Webcams are manufactured by Logitech™ and other companies. The video conferencing client software runs on the PC and utilizes the PC display and audio devices for the video call. Popular software products for a video call or video "instant messaging" include the Microsoft Netmeeting™ product, the MSN Messenger™ product, the AOL ICQ™ instant messaging product, and others. The IP and RTP based protocols are sometimes identical to the ones used by single-purpose videoconferencing systems (e.g., H.323) and sometimes are proprietary and rely on the client at the other side of the video call being from the same manufacturer.

EXAMPLE 3

A 3G videophone conducting a standard 3G video call using the UMTS network and the standardized protocols for holding such a call. The 3G videophone system typically utilizes the IP and RTP based H.324/3G-324M communication standard and encodes the video in the H.263 or MPEG-4 simple visual profile standards. In future UMTS networks, additional protocols for video calls may be introduced, such as, for example, the IMS/SIP standard.

Videoconferencing standards have generally been designed with the person-to-person communication mode in mind, but they are currently also utilized for other purposes using some special methods. Some examples of other purposes include:

EXAMPLE 1

Video call numbers. In this usage model, the user of an imaging device (such as, for example, a 3G videophone) calls a pre-defined number as a video call, and consumes the audio-visual content through the video call. Thus, the video call is made not between two people but rather between a person utilizing a 3G videophone and a computational facility which retrieves requested content for this 3G videophone user. The video captured by the 3G device held by the user is not transmitted to the server, or is transmitted and ignored by the server.

EXAMPLE 2

Video voicemail or video messaging. In this usage model, the server on the other side of the video call is used to store the video data generated by the imaging device user (as in present day Voicemail systems) so that the intended recipient may retrieve the video data. Alternatively, the user may be calling his or her own video mail box, and retrieve messages left for that user. Systems for Video Mail are produced by companies such as Comverse™ and Unisys™, among others.

EXAMPLE 3

Video IVR (Interactive Voice Response). In this usage model, the user holds an IVR session with a server, where the video channel from the server to the user is used to display additional information, such as a menu, or results from previous operations. The main advantage of a video IVR is speed. The user can, for example, read the menu items instead of listening to the list of options and hence decide quickly which options are relevant for that user. Systems for Video IVR are currently produced by companies such as TNO labs in the Netherlands. There exist systems where the imaging device user can say or pronounce the intended names, numerals, or other choices (such as "Yes" or "No" answers).

As may be inferred from the discussion above or other related art, the user input or user interaction method that the previously described systems provide for, rely on the user's entering information before or during a communication session. This entry is done when the user uses either the phone and/or personal computer keypad and/or the user's voice and a voice recognition system (where the voice recognition system is typically located on the server side of the system). The information entered by the user may consist of one or more items, including, for example, the number to call in advance, the menu option chosen, the phone number of a message's intended recipient, catalog or coupon numbers, personal identification data, credit card information, login and password, date and time, URL, residential address, e-mail, or an alternative phone number.

There are some significant limitations and disadvantages to the form of input employed in the prior art (be it keypad or voice). These limitations and disadvantages include:

Limitation or Disadvantage of Related Art 1: The entry of long strings of numbers (such as a credit card number, an account number, or a login name) is lengthy, error-prone, and typically requires feedback from the IVR system in order to verify the number or string.

Limitation or Disadvantage of Related Art 2: There is no convenient and quick way to enter names, words, URLs, or symbols via the keypad letters or voice command. The user may be required to enter such information via alternative methods (such as the entry of encoded letters on a dial-pad in an SMS message).

Limitation or Disadvantage of Related Art 3: There is no way for the user to enter, via the keypad or voice command, general graphic information (such as company logo or special coupon) or handwritten information (such as a signature).

A different method of user input might allow the user to take an image of the object to be recognized or acted upon. This image-based data entry method is a powerful alternative, and can use an image obtained as part of a video call. An example of such an image-based data entry appears in U.S. Non Provisional patent application Ser. No. 11/266,378, entitled, "System and method of enabling a cellular/wireless device with imaging capabilities to decode printed alphanumeric characters", invented by Zvi Lev, the applicant herein, filed Nov. 4, 2005, and incorporated herein by reference, and U.S. Non Provisional application Ser. No. 11/293,300, entitled, "System and method of generic symbol recognition and user authentication using a communication device with imaging capabilities", invented by Zvi Lev, the applicant herein, filed Dec. 5, 2005 and incorporated herein by reference. However, without features set forth in the exemplary embodiments of the present invention, this data entry method will also suffer limitations or disadvantages. By using only a single image from a video call, the image based method has the following potential limitations or disadvantages:

Potential Limitation or Disadvantage of Data Entry 1: If the object is a long URL, a large logo, a graphical picture, or some other detail-rich or large piece of printed information, a single image of the object may not cover all of the object, or alternatively if the user were to image the complete object in a single photo, the resolution would be too low to enable recognition. As an example of the problem from low resolution, the image of a full printed A4 sized page cannot be reliably decoded for printed letters from a 3G video frame of 176 by 144 pixels. (A frame of this size is known as "QCIF size").

Potential Limitation or Disadvantage of Data Entry 2: In a single photo or image, the lighting conditions may create a situation where there are reflections or shadowed areas that make complete decoding of the symbols impossible from any (or at least from most) view angles. This problem tends to be especially acute when the object to be imaged is on a shiny/glossy paper.

Potential Limitation or Disadvantage of Data Entry 3: Even if the object is captured in a series of images rather than in one or a very limited number of images, nevertheless the user must be provided with an effective method of selecting the relevant video frames or video segment to be recognized in the video call. Without such a method, the computational facility at the other side of the video call would have to process all received frames for recognition of the relevant information.

Potential Limitation or Disadvantage of Data Entry 4: In many cases it would be advantageous to provide the user with some feedback during or shortly after the video capture of the relevant object. This is impossible to do when the object is captured by only a single image, and very difficult to do when the image is captured by a limited number of images.

SUMMARY OF THE EXEMPLARY EMBODIMENTS OF THE INVENTION

Accordingly, a user interface based on a video call is needed. Such an interface, not available in the prior art, could offer a number of built-in advantages, such as keypad DTMF recognition, voice recognition, fast turnaround time, and an all-in-one service with a streamlined experience (that is to say, with all-in-one service there would be no need to switch between different types of applications on the communication device or to switch between communication modes).

An aspect of the exemplary embodiments of the present invention is to solve the above-mentioned limitations and disadvantages by utilizing the imaging and video transmission capabilities of a wireless device in conjunction with special recognition capabilities. Some of the special recognition capabilities exist today, and some have been developed by the inventor and are specified and referenced herein in exemplary embodiments of the invention. The exemplary embodiments of the invention allow better utilization of video clips, and improve the user experience in the application of video call technologies.

The exemplary embodiments of the present invention present a system and a method that enable the user of a camera phone to perform all or part of the data entry via video data by showing the object of interest to the camera on the imaging device (rather than entering data through the keypad or a speech system, which are methods employed in the prior art). This video data entry may be silent, since the user's input is silent (that is to say, no voice system is required). The computational facility response may also be through the video channel, and hence may also be silent. The utilization of visual input as the main form of data entry allows for further compound operations to be executed more conveniently in many scenarios. Some examples or such further scenarios are:

EXAMPLE 1 OF COMPOUND OPERATIONS

The user can add images of objects or the user's surroundings as part of the data entry process. For example, during a video call, a user can aim the camera at a printed bill or coupon, then at the user himself to prove his identity for the bill payment or coupon redemption

EXAMPLE 2 OF COMPOUND OPERATIONS

The fact that a video call has been initiated makes the consumption of video content a streamlined experience since the user's device does not need to switch communication modes. A user could first aim the camera at an advertisement, and then watch a video clip related to the advertisement without disconnecting the call or reinitiating a communication link.

EXAMPLE 3 OF COMPOUND OPERATIONS

The user initiates a video call and uses the camera of a mobile device to scan a document or parts of a document so that they are later enhanced and routed for archiving, processing, or communication purposes (e.g., fax or email). Such document scanning and processing is described, for example, in U.S. Non Provisional patent application Ser. No. 11/337, 492, entitled, "System and method of improving the legibility and applicability of document pictures using form based image enhancement", invented by Zvi Lev, the applicant herein, filed Jan. 24, 2006, incorporated herein by reference.

The exemplary embodiments of the present invention may enhance the utility of the video call analysis over prior art in the following ways:

Enhanced Utility of Video Call Analysis 1: The data from multiple video frames is combined to better process the image for recognition or enhancement, including, for example, increasing the amount of covered area, enhancing the quality of the image resolution, and boosting the signal to noise ratio of the image.

Enhanced Utility of Video Call Analysis 2: The data from video frames of the same scene which contain partial information is typically distorted because of illumination or screen display effects. Examples of such effects include illumination overexposure, illumination underexposure, and the vertical banding effects seen on CRT screens when the camera exposure time is short. The exemplary embodiments of the current invention combine the partial information of multiple frames, and employ simple or weighted averaging to remove the unwanted effects of illumination and/or screen display.

The exemplary embodiments of the present invention may enhance the user interface of the video call over prior art in the following ways:

Enhanced User Interface 1: The user can indicate his or her choice of an object for recognition or enhancement by pressing a key on the imaging device (e.g., on a mobile device in a video call this would result in the sending of a DTMF command from the mobile phone to the server).

Enhanced User Interface 2: The user can indicate his or her choice of an object for recognition or enhancement by physically zooming in with-the imaging device on the object of interest.

Enhanced User Interface 3: The server can provide interactive feedback to the user during the imaging operation, by sending indications to the user. Examples of such indications are:

INDICATION EXAMPLE 1

A loopback version of the video captured by the user as part of the video call with additional processing such as, e.g., contrast enhancement or magnification. Thus, the user can see on the screen of the imaging device a simulated viewfinder that can help the user in the aiming process.

INDICATION EXAMPLE 2

Audio Visual feedback. For example, if the user is scanning some alphanumeric code, audio feedback can be provided to the user warning that the camera is too close to, or too far from, the imaged text. Similarly, arrows or guidelines could be displayed on the screen to indicate if the scanning motion is too fast or too slow, and to indicate the direction in which to move the imaging device for best enhancement or object recognition.

INDICATION EXAMPLE 3

Instructions and guidelines indicating the type of operation the user should perform next. As an example, if the user is scanning a form, the instructions (textual or auditory) may indicate to the user which fields in the form should be scanned next.

Here are some concrete examples of the potential utilization of video calls and how the improvements created by the exemplary embodiments of the invention may extend the utility and performance of the system and method over prior art:

SYSTEM EXAMPLE 1

A user scans a part of a printed document by holding the imaging device aimed at the document for a few seconds. The small movements of user's hand create frames shifted with regard to each other. Some dedicated image processing of these frames enables higher resolution imaging, also called "super-resolution" in image processing terminology. The processing of multiple frames, and using partial information from multiple frames, is an improvement over prior art where a single frame of the video may have been used, resulting in a lower resolution and a lower signal to noise ratio.

SYSTEM EXAMPLE 2

A user aims the imaging device at a logo displayed on a computer or a TV screen for a few seconds, so that the effects of vertical banding are reduced by the combined processing of consecutive frames. Thus, recognition of the logo is possible. In prior art, if only a single frame has been used for recognition, the logo may have not been recognizable as parts of it would have appeared dark due to the vertical banding effect. Video artifacts caused by compression at low bit rates can be eliminated in a similar fashion.

SYSTEM EXAMPLE 3

A user selects a logo or item out of several such logos or items printed on a page by moving the camera closer to that specific logo, hence indicating the user's choice. In prior art, this method of selection was not supported, hence it would not have been clear which of the several different logos is the one of interest to the user.

SYSTEM EXAMPLE 4

A user scans an alphanumeric code as part of a video call. During the scan the user moves the imaging device over the code, thus imaging the code at a short distance. The resulting image resolution for each frame is high and the document area coverage is achieved by combining information from several frames.

Also a part of the exemplary embodiments of the invention is a new method of charging customers, based on information gleaned from the new exemplary system and method. The method of charging users for use of the system can be based on multiple criteria, such as integration of recognition as a part of a premium service (paid indirectly by the consumer of the premium service), coverage of the recognition costs by a coupon or advertisement (paid partially by the coupon or advertisement originator), collecting statistics about users habits (paid by third parties), usage time (thus the air time or processing load consumed may be used to calculate user bills), and added value of the service (artifacts removed and text recognized, which might also be used to calculate user bills). It should be noted that some infrastructures, such as video call for 3G mobile devices, allow streamlined experience with integrated user response, premium services, and multiple recognition sessions.

The techniques enabling the advantages and examples presented above are discussed in the section below entitled, "Detailed Discussion of the Exemplary Embodiments". The techniques can take various embodiments, based on type of the image, availability of camera model, frame rate, and required validation criteria. The techniques are executed on the system described herein, and the results from execution are stored or displayed on that system.

BRIEF DESCRIPTION OF THE DRAWINGS

Various other objects, features and attendant advantages of the exemplary embodiments of the present invention will become fully appreciated as the same become better understood when considered in conjunction with the accompanying detailed description, the appended claims, and the accompanying drawings, in which:

DETAILED DESCRIPTION OF THE EXEMPLARY EMBODIMENTS

In exemplary, non-limiting embodiments of the present invention, same numeric references denote analogous elements. Such numeric references will be used throughout this Detailed Description of the Exemplary Embodiments.

Figure 1:
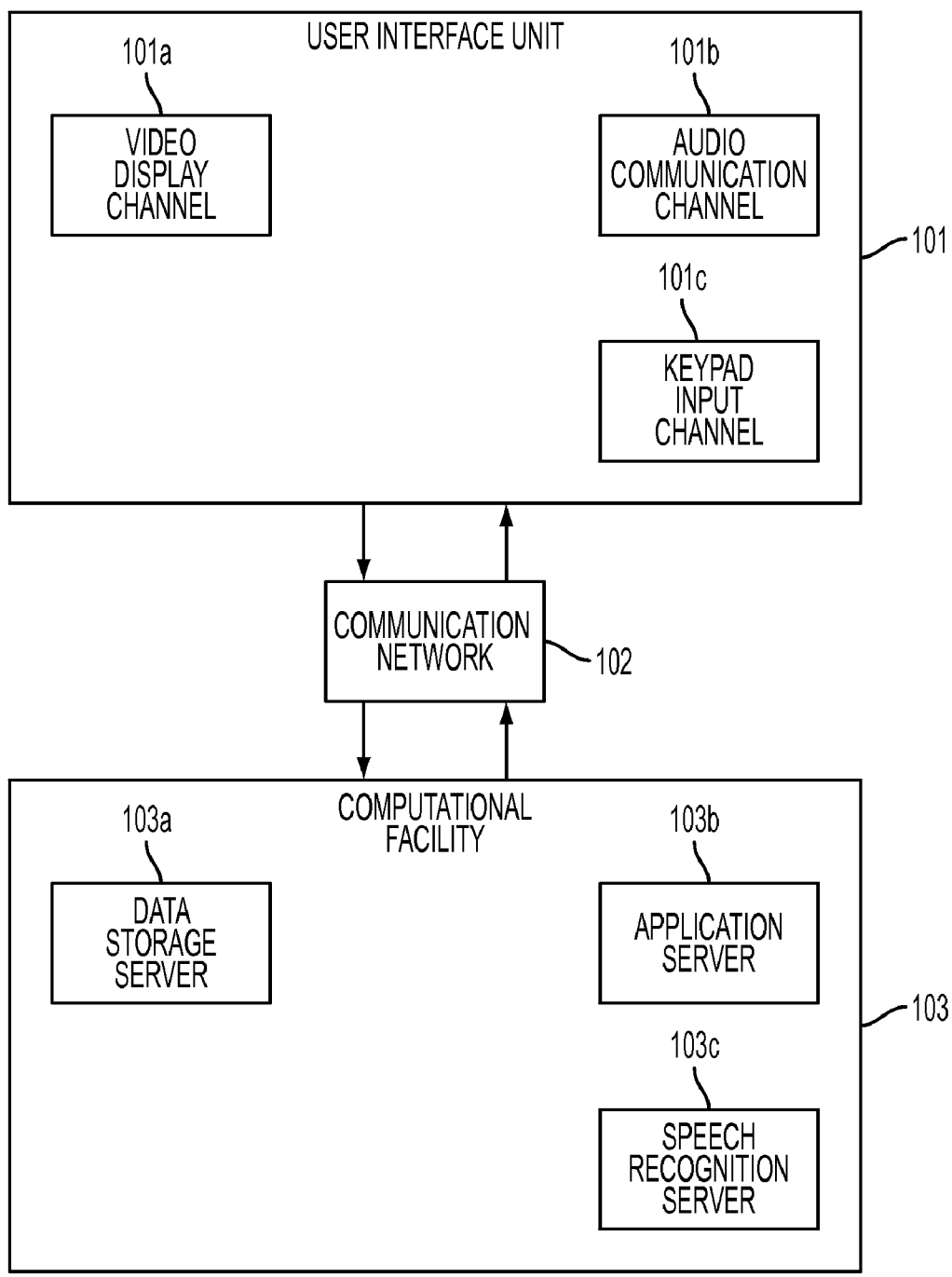
FIG. 1 shows a typical embodiment of a related art IVR system.

A typical embodiment of prior art Voice/DTMF based IVR system is depicted on FIG. 1. The system comprises the following subsystems:

1. User interface unit 101. This is a mobile or fixed device which has multiple I/O channels for the IVR system. The user interface unit typically uses the following channels:

Channel 1: Video display channel 101*a* is used to show the user visual data, such as menus, help screens, promotion videos, and stored video content.

Channel 2: Audio communication channel 101*b* is used for two-way communication with the user. The channel 101*b* is used for audio output, such as instructions, results and stored audio content. The channel 101*b* can also be used for user input, by having the user speak certain commands, which are to be recognized and acted upon in a computational facility 103.

Channel 3: Keypad input channel 101*c* provides for user input through the device keypad. The text input may be encoded as DTMF signals in a mobile or fixed telephony network, or as encoded text in SIP based sessions.

2. A communication network 102 can be a wireline or wireless network, supporting video calls.

3. Computational facility 103 is typically a remote server facility with the following components:

Component 1: Data storage server 103*a* is used to store the requests history and video content.

Component 2: Application server 103*b* is responsible for understanding user selection and acting upon user selection. For example, in phone IVR systems, this server may execute VXML (Voice eXtended Markup Language) commands. In IMS/SIP sessions, this element may be an SIP application server or an OSA/Parlay server. In video portal applications this server may support scripting languages with video support such as V2XML™ by Radvision, Inc.

Component 3: Voice or speech recognition server 103*c* recognizes words and phrases uttered by the user. For example, the Nortel™ Media Processing Server (MPS) is such a product.

Thus, the user input is facilitated in prior art by pressing keys and speaking, using channels 101*b* and 101*c*. The output to the user is displayed and played using channels 101*a* and 101*b*. For example, the user may press keys on the mobile device to convey data to the computational facility. Alternatively, the user may make a sound or speak a word or phrase (e.g., "Call John Smith") to indicate a desired operation or generally to convey data.

Figure 2:
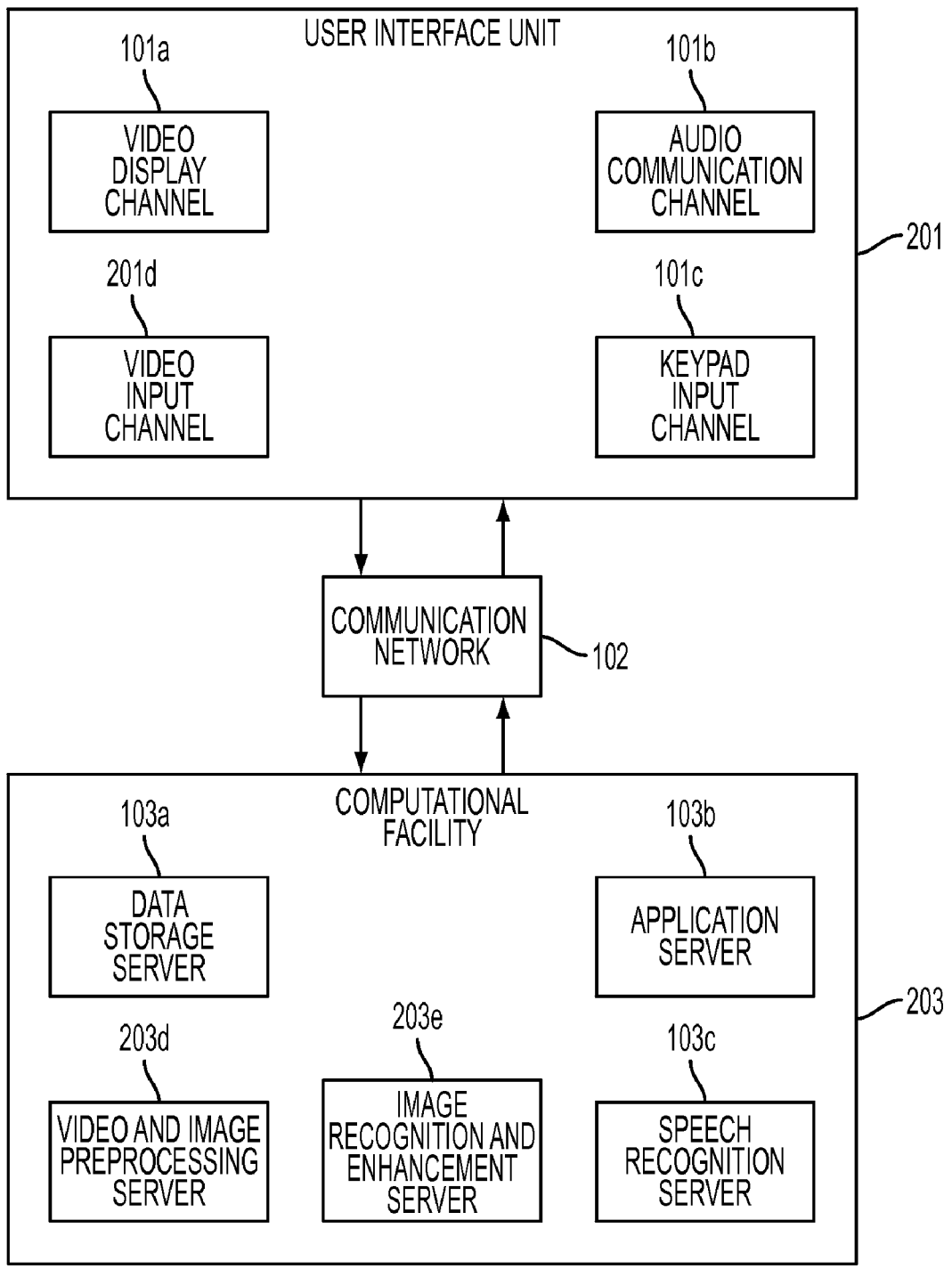
FIG. 2 shows a system according to an exemplary, non-limiting embodiment of the invention.

A system according to an exemplary, non-limiting embodiment of the present invention is depicted in FIG. 2. The exemplary system can be applied to any imaging device with network connectivity, including, for example, wireless products such as a 3G wireless device with video telephony capability, 2G wireless devices with video MMS capabilities, personal computers with a webcam and Internet access, PDAs with network connection, and video conferencing systems. The system consists of the following components:

1. User interface unit 201. This can be a UMTS mobile device. As another example, this can be a combination of a tethered web camera and a personal computer. This unit is a video call session endpoint, supporting the transmission and reception of audiovisual information in real time. The following communication channels are used:

Channel 1: Video display channel 101a has been described above, and is analogous to the channel employed in FIG. 1. In user interface unit 201, this channel displays the video output of the computational facility 203, which is the other endpoint of the video call. It can serve to display visual feedback from the user's imaging device (e.g., the camera viewfinder), menus or other textual information, and video content. Typically, most or all of the video display is dedicated to video content generated by the remote computational facility 203.

Channel 2: Audio communication channel 101*b* has been described above, and is analogous to the channel employed in FIG. 1. This channel can be used for two-way communication with the user. User auditory input, such as spoken commands, may be utilized as in prior art as an additional user interface channel.

Channel 3: Keypad input channel 101*c* has been described above, and is analogous to the channel employed in FIG. 1.

Channel 4: Video input channel 201*d* is used for video data taken by the user of the imaging device. This data is later preprocessed by the video and image preprocessing server 203*d* and recognized by the image recognition and enhancement server 203*e*.

2. The data or communication network 102 can be a UMTS, WiFi or wireline (e.g. LAN/ADSL) network, supporting video telephony.

3. Computational facility 203 is typically a remote server facility with the following servers:

3a. Data storage server 103*a* has been described above, and is the same server as employed in FIG. 1. In computational facility 203, the data storage server 103*a* is used to store the video data for the video and image preprocessing server 203*d*. The storage of the video sequence is necessary for enabling the video preprocessing, because in video processing typically each video frame depends on previous frames. This dependency of frames on earlier frames is especially strong in typical UMTS video telephony sessions, where Intra Frames (also known as "I frames") are relatively rare compared to the usually more frequent Inter frames (which may be "P frames" or "B frames").

3b. Application server 103*b* has been described above, and is analogous to the server employed in FIG. 1. In the computational facility 203, the server may support a richer command set than in the computational facility 103, because the server in the computational facility 203 must process video incoming from the user and then act upon the recognition results. Hence, although both the structure and the basic functionality of the application server 103*b* are analogous to the application server in FIG. 1, within the computational facility 203, the functionality of the application server 103*b* may be enhanced.

3c. Speech recognition server 103*c* in FIG. 2 is analogous in structure and functionality to element 103*c* in FIG. 1.

3d. The video and image preprocessing server 203*d* performs the following operations on the video:

Operation A of 203*d*: Video error correction. The video sequence may include bit errors due to the data transmission process. Such bit errors can cause a spatially and temporally localized or extended disturbance in the decoding of the current and subsequent video frames, and thus render accurate recognition and enhancement impossible. There are several well known methods of error concealment and correction in video processing. The exemplary embodiment of the present invention may employ prior art methods for video error correction. In addition, the exemplary embodiment of the current invention may also employ a new method that is simple, yet effective, that is, the system ignores a predetermined number of frames after each damaged frame. Damaged frames are identified by errors in the decoding of the video codec when these frames are decoded. For example, the H.263 and similar video codecs specify certain bit streams that should mark the beginning of a new video frame and/or parts of such a frame. The absence (or premature presence) of such codes is a clear indication that the frame is damaged. The number and type of missing or malformed data fields in the frame can serve to indicate the severity of this damage. Based on the estimate of the damage type and severity, a decision is made on how many frames to skip prior to the subsequent preprocessing and recognition operations. For example, a frame with one damage motion vector may cause this frame to be discarded, and all undamaged subsequent frames to be used, while a frame with multiple errors or errors in a group of blocks ("GOB") header will cause the frame and 10 or more subsequent frames to be discarded or even to cause all frames until the next I frame (Intra frame) to be discarded.

This novel exemplary method is effective for video error correction because the user is not moving the imaging device (or is moving the device only slightly) when imaging the object to be enhanced or recognized. This method relies on information generated during the video decoding process. Therefore, in this method, the system has access to error information which is lost in some prior art that attempts to correct video artifacts based on the extracted video frames after decoding. For example, a bit error in a motion vector may be treated differently than a bit error in a Group Of Blocks (GOB) header, yet this kind of distinction could not be made in prior art that just looks at the decoded images without knowing the potential source of the errors.

Operation B of 203*d*: Frame combination. Unlike prior art methods of image resolution enhancement from video frames, an exemplary embodiment of the present invention relies on major overlap between subsequent frames (typically over approximately 90% overlap) to apply a novel and new frame combination technique. This technique, described in FIG. 3 and the accompanying text, utilizes the large overlap and small variations in scale and orientation between earlier and later frames to recreate an image that combines the information from multiple images. The resulting combined image offers better signal to noise, better resolution, and better resiliency to imaging artifacts such as changes in lighting changes or display, than would be achieved by processing only the incoming frames without a combination of earlier and later frames. The combined image also offers some resiliency towards minor transmission errors that cannot be corrected at the video stream level and that cannot be ignored solely by deleting the affected frames.

Operation C of 203*d*: Optimal frame selection. Additionally or instead of combining frames and/or correcting for video transmission errors, the selective use of some of the frames may be used to improve the utility of the resulting frame sequence. For example, if some of the frames are blurred or geometrically distorted due to motion of the hand of the user, or if some of the frames are shadowed or overexposed due to illumination changes, these frames can be removed from the video sequence, thus removing artifacts and improving the visual quality, registration accuracy, and recognition accuracy of the video sequence.

Operation D of 203*d*: Additional image processing operations. Additional image processing operations may be required, or useful, for optimal recognition or enhancement, and may be employed in the exemplary embodiment of the present invention. For example, processing operations such as histogram stretching, DCT blocking effect removal, color correction, or other similar operations, may be applied to the resulting images from the frame extraction and combination.

3e. The image recognition and enhancement server 203*e* executes recognition and/or enhancement operations based on the image or images obtained from the video and preprocessing server 203*d*. These operations include symbols and logo recognition, barcode recognition, alphanumeric character recognition, user marks recognition, document enhancement, and processing for legibility and recognition.

Figure 3:
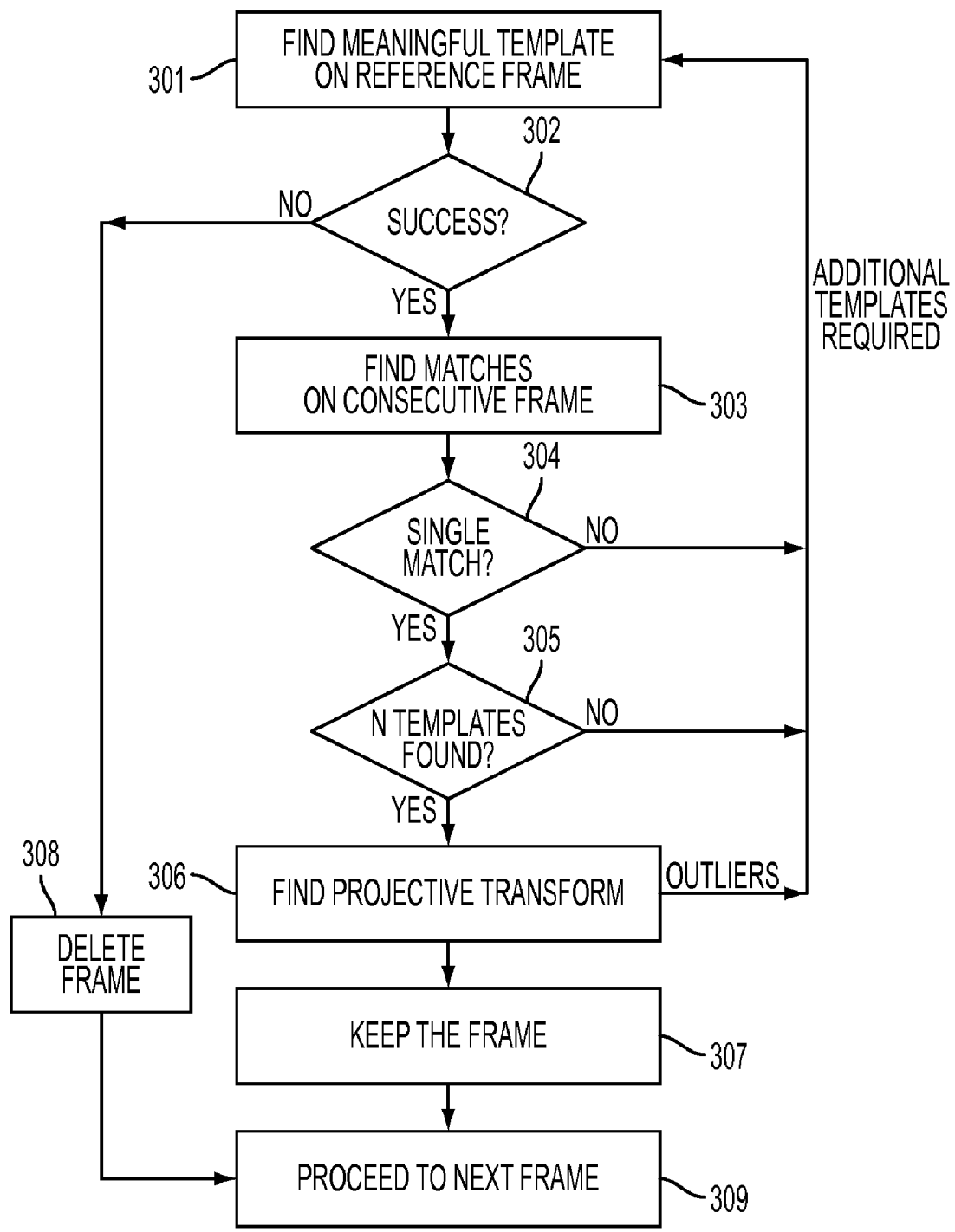
FIG. 3 shows template-matching image registration technique according to an exemplary, non-limiting embodiment of the present invention.

A new and useful exemplary technique for performing image recognition and enhancement operations in server 203*e* is depicted in FIG. 3. The technique will be described generally, and then with reference to the specific elements in FIG. 3.

General Description of the Exemplary Technique in FIG. 3: The process of combining of various frames in the video clip/image sequence requires correct registration between the frames. A novel technique is hereby described in FIG. 3 for performing precise registration between frames which are assumed to have significant overlap between them and that are assumed to be taken at similar imaging angles and distances from the imaged object. This is a valid description of the frames that one would expect to encounter in a video call when the user is holding the imaging device still and pointing it at some object for a fraction of a second up to several seconds. Typical video telephony frame rates are 3 frames per second and upwards, hence the registration technique should include camera motion model for accurate registration. The camera movement by the user is assumed to be smooth and can be guided by special visual clues (such as, for example, a grid). The model of camera motion allows the following advantages:

Advantage 1: The changes in image scale and geometry can be anticipated and the registration templates changed accordingly Advantage 2: The relative movement between frames can be anticipated and the templates disappearing from camera's field of view can be removed. New templates can be found in the area coming into the camera's field of view.

Advantage 3: Reduction of the search window for the registration technique due to relative movement anticipation between frames allows faster and more accurate computer implementation.

Advantage 4: If for some reason the registration inside the anticipated movement window fails, and registration outside this window succeeds, this indicates a change in user behavior and can be used for application needs. For example:

Application Use 1: Fast movement of the camera causes motion blur, and the blurred images can be removed by the computational facility.

Application Use 2: If the user zooms the camera on an object, this can serve as an indication for the object recognition to begin to attempt to recognize the object at the center of the camera field of view.

Application Use 3: If the user moves the camera away from an object on which the camera was focused for a few seconds, this indicates to the computational facility that the filming of the object has been terminated.

The Flow of the Technique in FIG. 3 According to an Exemplary Embodiment of the Present Invention.

1. In 301, a template area is chosen as the reference image. The following issues may arise in 301:

Issue 1 in 301: The reference frame is defined as one frame onto which all other frames are registered. The reference frame may be the first frame in the sequence on which the technique operates, or the middle one, or a frame chosen for lack of video transmission errors or other qualities. A middle one chosen as a reference frame could be, for example an I frame (although an I frame could of course also appear at the start or end of a sequence).

Issue 2 in 301: The image registration and geometry correction is critical despite the general similarity in scale and orientation between the frames. Even a 1 degree rotation between frames or a 1% scale change would result in pixel smear larger than one pixel on the edges of such frames, thereby negating the potential benefit of combining several frames together. Image registration and geometry correction will correct errors of degree rotation.

Issue 3 in 301: The technique works by choosing small image regions (typically of a size of 16 by 16, or 24 by 24, pixels) in the reference image and locating the corresponding image regions in the other frames. In this way, a precise geometric transformation can be applied to the other frames so that they are of exactly the same scale, orientation and geometry as the reference frame.

Issue 4 in 301: For more accurate registration, there might multiple shapes and sizes of templates (such as cross, prolonged, or disc templates) used in the same registration framework. For example, multiple scales of resolution, and prolonged one-dimensional templates, may be used in conjunction with diamond-shaped 2-dimensional templates. The resolution variability allows speed optimization and robustness to variations, while the shape of the template minimizes the noise due to irrelevant data. The 2-dimensional templates are generally more useful than 1-dimensional templates, since each 2-dimensional template is equivalent to both horizontal and vertical templates.

Issue 5 in 301: One of key concepts of the new exemplary technique is that the frames are indeed similar enough that small templates can be successfully and reliably matched between them, and that the information about the relative location of those templates in the different frames can then be used to resample those frames to the same geometry and scale, thus enabling their effective combination into a single image.

Issue 6 in 301: It makes sense to execute some image processing on the frames prior to execution of the image registration technique. For color frames, it makes sense to execute the image registration technique on the luminance channel of the frame only. This Luminance channel is a grayscale image, and is often referred to as the "Y" channel in the YUV color space. In most codecs related to video compression and transmission, the "Y" channel is sampled at a higher resolution (typically 2× in each axis) than the color-encoding "U" and "V" channels. Thus, the direct use of the "Y" channel is a novel and effective method to improve resolution of the image in the context of image enhancement and object recognition from the video channel. This "Y" channel grayscale image can be subjected to some image enhancement procedures (e.g., illumination correction, noise removal, or geometry correction) to generate an image called, in the description of this technique's intensity, the "intensity image". Thus the "intensity image" is a grayscale image generated from an original color image.

Issue 7 in 301: A general point which should be noted about the image registration algorithm is that prior art dealing with image mosaicing and stitching is centered on images taken from a large distance. Hence, in prior art, perspective effects and other finite-distance imaging effects are usually neglected. In an exemplary embodiment of the present invention, the imaging distances may be either long (so that perspective effects may be neglected, e.g., 0 when imaging a sign from a few meters) or short (e.g., for imaging text printed on a page or a product label, which could be at a distance of 5 centimeters). The techniques described herein as certain non-limiting embodiments, will handle effectively cases of both long and short imaging distances.

2. In operation 302, the template choice is validated. Since the template chosen in 301 is to be searched for in the subsequent frames, the template image should be as dissimilar as possible from other areas in the image. Several issues may arise in relation to 302.

Issue 1 in 302: A template chosen in, for example, an area of a page which has no graphics or writing in it, would match very well with any other such blank area on the page, and would thus be a very poor candidate for a template (since such a template would not allow meaningful comparisons to areas of the imaged object).

Issue 2 in 302: Potential templates can be screened by searching for areas with large absolute partial derivatives of the intensity image on the X and Y axes.

Issue 3 in 302: An additional criterion for template validation would be high energy content in the upper spatial frequencies of the two dimensional Fourier transform of the intensity image.

Issue 4 in 302: Another simple and effective criterion for a template candidate is to search for close matches to this template in the same image from which it was taken, and verify that the template candidate does not match very well with other parts of this image. The template regions for comparison may be randomly picked from the reference frame, and these regions could then be compared to the template candidate.

The template candidate with the best score on the various criteria mentioned above (or upon similar criteria), will be chosen as a template to be used for the frame matching and registration.

3. Once a template has been chosen in operation 302, the template is searched for the other frames in operation 303. The search can be based on template matching (using, for example, normalized cross correlation) or other distance measures (such as L1, and L2 distance measures on the intensity image). It is also possible to use the multi-template technique described in U.S. Non Provisional patent application Ser. Nos. 11/266,378 and 11/293,300, cited previously.

4. A single match will be declared in operation 304 (and a successful location of the template on a new frame, which is necessarily implied by the declaration of a single match), if the local match value is above a certain threshold (e.g., the normalized cross-correlation is above approximately 0.9 or the normalized cross-correlation is substantially above 0.5), and also other criteria are satisfied. Various other criteria for declaring a single match of the image to the reference could include the following:

Criterion 1 for the Single Match: A good criterion could be that a high match value for the template is located in only one position in the searched image, and/or that the match is found in the expected area knowing the expected overlap between the reference frame and the searched frame.

Criterion 2 for the Single Match: Another powerful and novel criterion used in an exemplary embodiment of the present invention is the "inverse match" criterion. That is, if template from location A in the reference frame R is found in frame S at location B by a certain match criterion, then the area around location B, frame S, is searched in the reference frame R and should be found to match by the same criteria the area around location A in the reference frame.

If a single match is not obtained, the method returns to operation 301.

5. In operation 305, once N such templates from the reference image are located in a different frame, a projective geometry transform can be calculated (in operation 306) and applied to the different frame. The value N would depend on both the type of transform applied and the precision required versus the computation time. For example, an affine transform would require that N is greater than 3.

6. An important part of the exemplary technique is the outlier detection and handling in the calculation of the projection parameters 306. This process is important, since in some cases there may be false template matches which could change fundamentally the calculated transform parameters. This outlier detection process is implemented in an exemplary embodiment of the present invention by calculating the median displacement in the X and Y axes between the templates in the reference frame and their matches in the other frame, and then deleting template matches that deviate from this displacement by more than a certain number of pixels. Another exemplary embodiment is to calculate a polynomial fit between the X,Y coordinates of the templates in the reference frame and those of their matches in the other frame, and then to delete matches which deviate by a certain threshold from the polynomial fit.

In case the template matching process has indeed yielded the required number of matches N, the new frame is combined with the previous one.

7. After successful completion of the projective transform in operation 306, the reference and its transformation matrix are kept, in operation 307, on the storage server.

Registration sanity testing should be performed on each subsequent frame, but also on sequences of frames. The sanity of the registration of a sequence on images with size M can be verified by comparing of matches of first and M'th images to each other against the subsequent registration.

It is noted that estimated camera movement can be very useful for prediction of conditions (such as scale and shift) for the next consecutive frame. Such a prediction would allow limiting the range of template search in terms of location, scale and projective geometry. Limiting the range of searching in this manner will speed the selection of an appropriate template. All this is possible because camera movement is usually smooth (especially for high frame rate), with limited acceleration and rate changes in all six degrees of freedom of an imaging apparatus.

8. In case of failure at operation 302, the putative consecutive frame is deleted in operation 308.

9. The exemplary technique then continues to do the same matching, resampling and combination process for the next frame in operation 309, until the exemplary technique has executed iteratively for all frames in the selected range of video data. Although the process is executed for all frames, nevertheless, it is possible to save computation time by keeping the templates from the reference frame for the following iterations.

There are several ways to determine which part of the video telephony video sequence is to be used for the recognition or enhancement. Once the relevant range of frames has been selected, the technique described in FIG. 3 will be applied to register and combine the frames. Note that the video sequence could be divided into series of subsequences (e.g., around I-frames) and the technique in FIG. 3 could be applied hierarchically.

The methods to activate dedicated recognition or enhancement are:

Method 1: The user presses keys on the keypad of the imaging device at the moment he or she is aiming at the target object. Then, once the system has determined the timing of the DTMF signal (or SIP signal) in the video telephony session, the frames taken at the same time (with some margin) are used for the registration technique.

Method 2: Use of voice command and voice recognition to activate video recognition or enhancement.

Method 3: Provided the object of interest contains some unique marker or logo, use marker/logo recognition to activate dedicated recognition or enhancement procedures. A discussion of some applicable recognition and enhancement procedures appears in U.S. Non Provisional patent application Ser. No. 11/293,300, and in U.S. Non Provisional patent application Ser. No. 11/337,492, cited previously.

In an exemplary embodiment of the present invention is proposed an additional new method to activate dedicated recognition or enhancement based on a camera model. For example, a user can perform some indicative motion. A useful instance is to have the user zoom in on the object of interest by moving the imaging device closer to this object. Then the video and image preprocessing server 203*d* would recognize the motion from the video sequence and recognize also the center of this motion (which would then represent the center of the object of interest). To eliminate the need of full registration at high frame rates, optical flow methods are typically used in such video sequences to determine both the movement and the center region.

Figure 4:
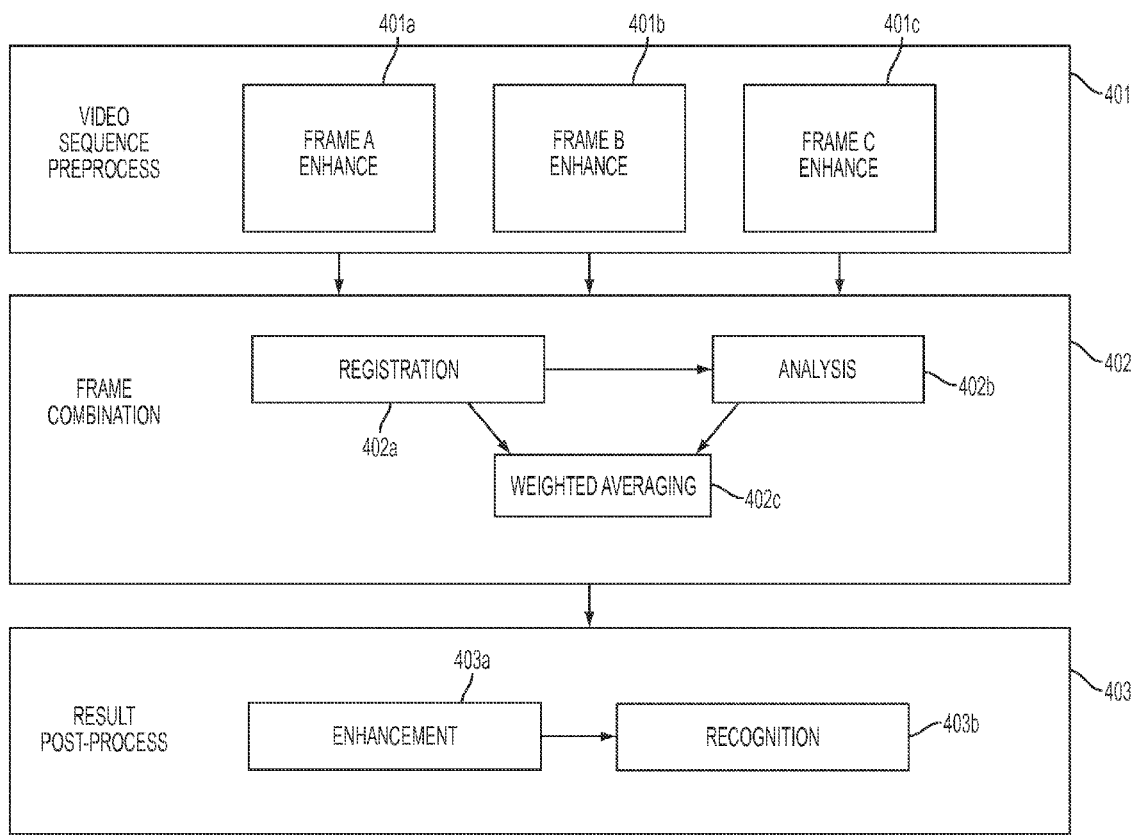
FIG. 4 illustrates a method for combining information from multiple frames according to an exemplary, non-limiting embodiment of the present invention.

The method for combination of the information from the multiple registered frames, may take different forms depending on the desired purpose. FIG. 4 provides a general illustration for these forms of processing according to an exemplary embodiment of the present invention. The framework consists of preprocessing 401 performed independently on each frame of the video sequence, frame combination techniques 402, and post-processing of the result 403. Some examples are:

Form of Information 1: For character recognition or logo recognition, which are based on template matching, it may be advantageous to keep just a "best" registered frame and avoid the other frames. The video preprocessing 401 implies illumination correction per frame in 401*a*, 401*b*, and 401*c*. The frame combination 402 includes frame registration, analysis, and averaging. The "best" frame for each image segment could be different. The frame registration 402*a* is performed to align the frames into a common coordinate system. The analysis operation. 402*b* provides the best candidate frame for each image segment (e.g., an overlapping 24×24 block) based on statistical criteria, e.g., contrast, resolution, and noise. For example, a part of the image to be recognized might be over-exposed in some frames, and thus for this area other frames would be used. The averaging operation 402*c* will typically be a weighted average of frames, where average is based on the statistical criteria found at 402*b*. This way, the system would be able to recognize 403*b* as a complete object, even though there might be no single frame where the whole object is visible and suitably exposed on in the right scale.

Form of Information 2: For document imaging and enhancement, where the area to be enhanced is known to be intrinsically bitonal (e.g., dark ink on a light background) the combination of several images could use statistical measures other than simple averaging to determine whether the each pixel is a background or foreground pixel. For example, the median of the gray scale values over the pixel value in the different frames could be used to avoid outlier values generated by illumination variations, video compression artifacts, or other distortions. A possible flow includes subpixel frame registration 402*a*, followed by pixel-wise median 402*c*, and the result enhancement 403*a* based on some form of geometry and illumination correction. An example for such geometry and illumination correction process is given in U.S. Non Provisional patent application Ser. No. 11/337,492, cited previously.

Form of Information 3: In cases where the original video telephony session resolution (typically QCIF) is insufficient, it is possible to combine the frames so as to increase to some degree the effective resolution of the combined image over that of the individual frames. This approach is often referred to as "super resolution" in the image processing literature. It should be noted that for super-resolution, the registration 402*a* between the frames has to be of sub-pixel accuracy. One method for establishing such accuracy is optical flow (via, for example, the Lucas-Kanade algorithm). Again, weighted averaging 402*c* may be applied here at the pixel level to give at each pixel larger weight to frames where the pixel was imaged at a greater resolution or at better quality (where the better quality might be due to, for example, appropriate exposure of the frame, that is the absence of overexposure in this frame). Some form of deconvolution, such as Lucy-Richardson algorithm, can be performed for the enhancement at 403*a*.

Form of Information 4: In addition to the previously described exemplary methods of creating a single higher quality image from several video frames, an exemplary embodiment of the present invention also allows for a transfer of several non-combined or partially combined images to the recognition server. This requires the recognition server to merge the recognition results from several images, and allows for spatially extended scanning of a longer or larger object. The easy match between recognition results is useful when working with long and inhomogeneous image sequences. Thus, in some recognition tasks the entire combination of multiple frames into a single image is impossible or very difficult, and can be circumvented by applying recognition to each frame or partial collection of frames separately, followed by a combination of the recognition results. For example, suppose a user wants to image the sequence "A quick brown fox jumped over the lazy dogs", as one line in high resolution. Multiple image frames taken a short distance from the document are required for the high-resolution scanning. The short distance between the imaging device and the document causes projective geometric artifacts. These artifacts could mean that taken as a combined image, the text could not be recognized (that is, could not be recognized by OCR) effectively. At the same time, these geometry changes do not create a problem when combining substrings produced by the OCR of each frame 401*a*, 401*b*, and 401*c*, e.g., "A quick brown fox", "ok brown fax jumped" and "ox jumped over the lazy dogs". Assuming significant overlap between frames, the original phrase "A quick brown fox jumped over the lazy dogs" can be easily reconstructed despite recognition errors in some substrings. The following exemplary technique can be used:

Operation 1. Find registration 402*a* minimizing the differences between overlapping parts of the substrings:

A quick brown fox
ok brown fax jumped
ox jumped over the lazy dogs

Operation 2. Use majority voting weighted averaging 402*c*, e.g., to solve the problem in the word "fox".

Operation 3. Use a dictionary-based analysis 403*b*, e.g., to solve the problem in the word "quick".

Operation 4. Concatenate the substrings, while removing duplicates 403*a*.

Other techniques for image recognition and enhancement, in addition to the exemplary technique described in FIG. 3, may be those described for example in U.S. Non Provisional patent applications Ser. Nos. 11/266,378 and 11/293,300, cited previously.

Figures 5A, 5B:
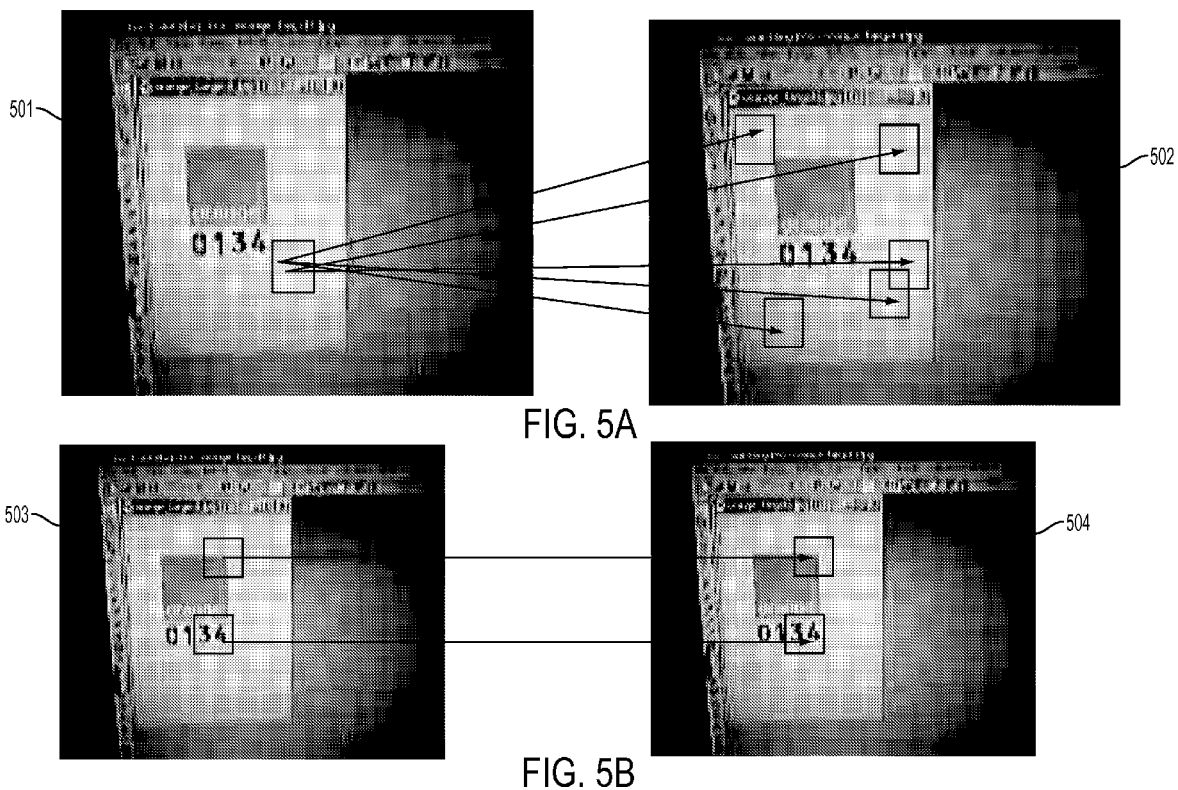
FIG. 5a illustrates unsuitable templates of the reference frame, for which many matches are found, and which do not satisfy the "inverse match" criterion and the associated template-matching image registration technique, according to an exemplary embodiment of the present invention.
FIG. 5b illustrates suitable templates, for which only one match is found, and to which the "inverse criterion" and the template-matching techniques apply, according to an exemplary, non-limiting embodiment of the present invention.

FIG. 5*a* and 5*b* together illustrate the inverse match comparison according to an exemplary embodiment of the present invention.

FIG. 5*a* illustrates unsuitable templates of the reference frame 501, for which many matches are found in a new frame 502. Since there is no unique match, FIG. 5*a* illustrates a template candidate which does not satisfy the inverse match criterion discussed in the description of FIG. 3 and the associated matching technique.

Conversely, FIG. 5*b* illustrates two suitable template candidates 503, for which each one finds only one match in the new frame 504. Since each template candidate has only one unique match, each candidate meets the inverse match criterion and associated matching technique.

Figure 6:
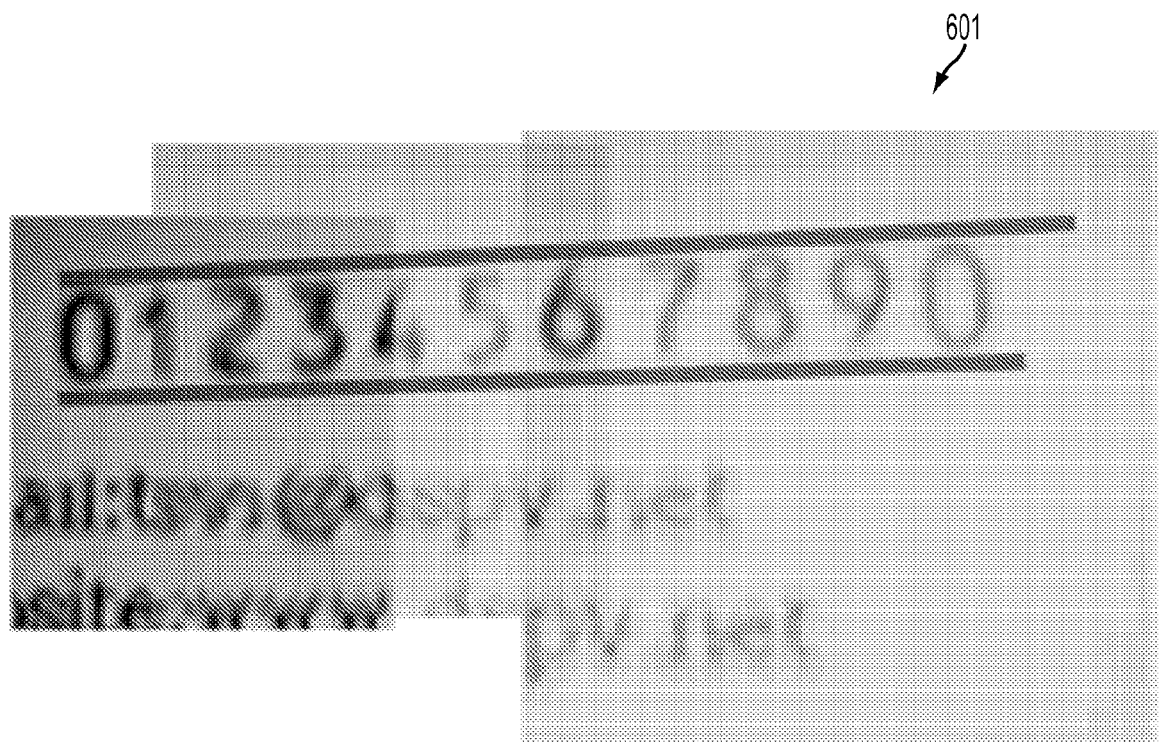
FIG. 6 illustrates scanning over a long string of alphanumeric characters, where several subsequent frames are combined in each stage according to an exemplary, non-limiting embodiment of the present invention.

FIG. 6 illustrates a case where a user performs a scanning motion over a long string of alphanumeric characters, according to an exemplary embodiment of the present invention.

The original object cannot be fully covered with sufficient resolution by a single frame in a video call. Therefore, multiple overlapping images are taken of the object, and the resulting frames are combined in each stage to produce a composite image. In FIG. 6, multiple overlapping images have been taken of the object, and these images have been combined to create the complete image in element 601. The figure also illustrates possible disadvantages of Form of Information 2 (FIG. 4) when compared with Form of Information 4. A standard OCR technique will typically fail on the combined image (Form of Information 2), due to scale and projective geometry problems. On the other hand, the frame-by-frame OCR will be successful and the combination of information (Form of Information 4) will be accurate.

Figure 7:
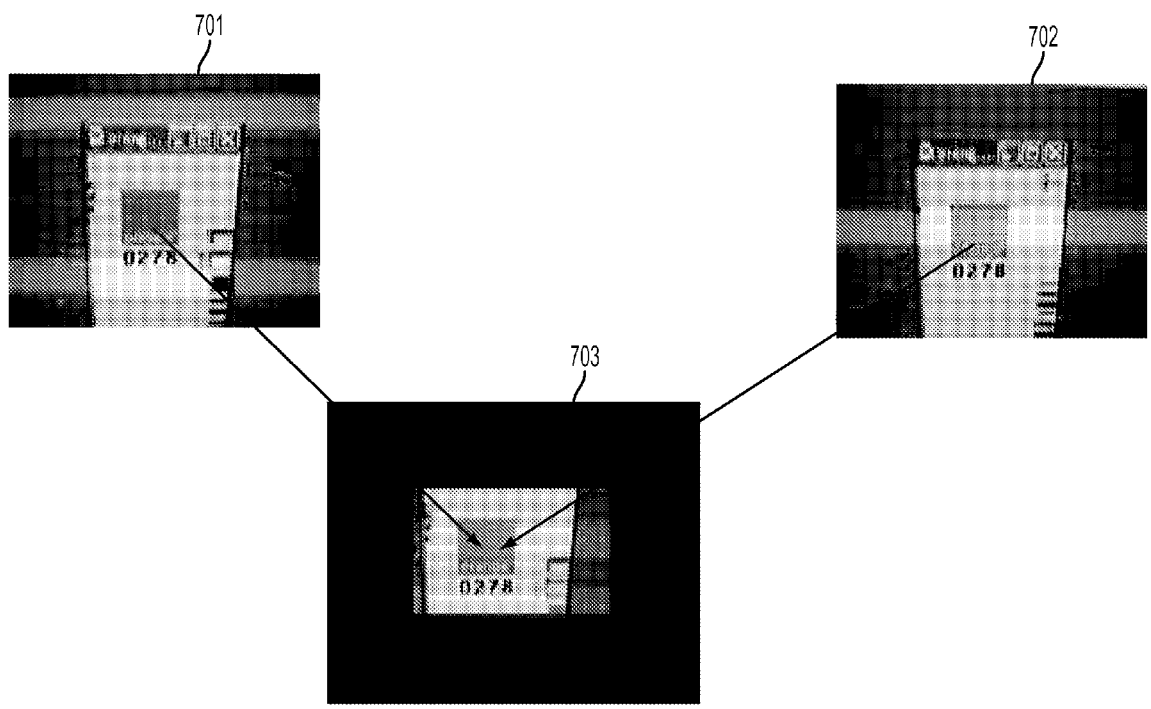
FIG. 7 illustrates how combining the frames using the median rule reduces the banding effects according to an exemplary, non-limiting embodiment of the present invention.

In FIG. 7, frames 701 and 702 are original images of the object, and these frames illustrate the defect know as "vertical banding effects", also sometimes known as "flicker," depicted as light bands in frames 701 and 702. Element 703 is an image of the original frames that has been combined using the median rule. This combined image illustrates greatly reduced vertical banding effects.

Figure 8:
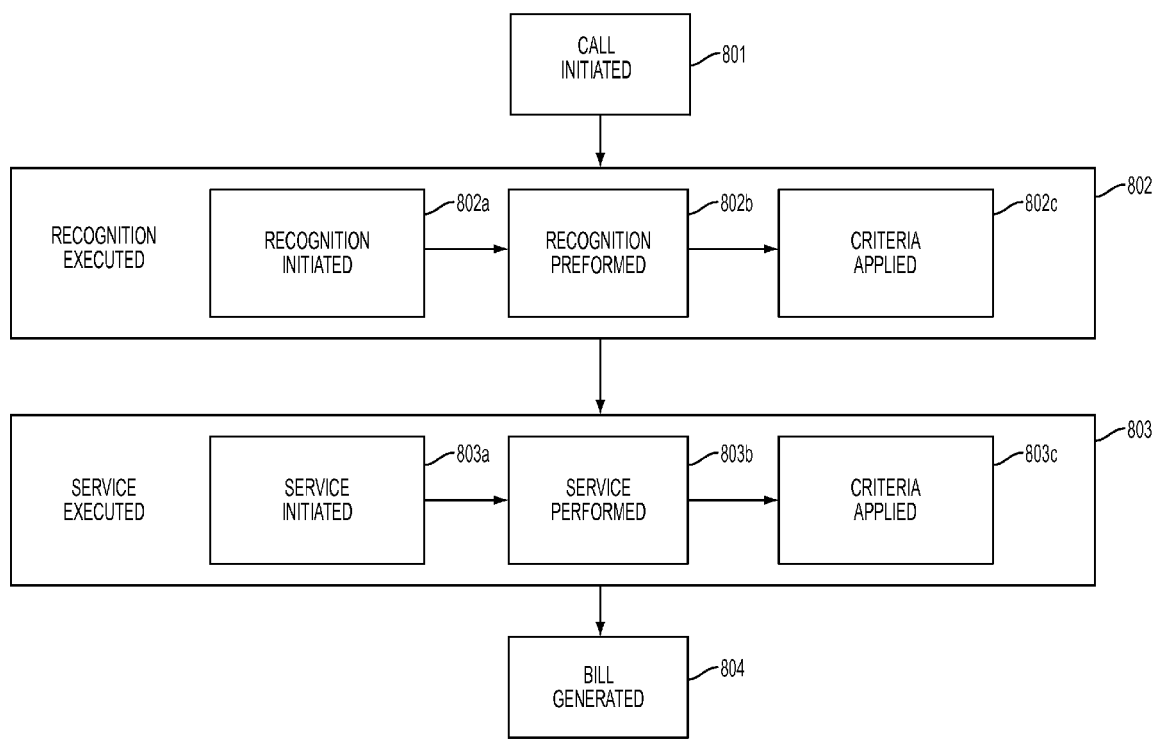
FIG. 8 illustrates a method for a different kind of customer charging, based on the recognition service from the system and method for information entry and processing according to an exemplary, non-limiting embodiment of the present invention.

FIG. 8 illustrates an exemplary, non-limiting method by which a bill will be generated and sent to the user, based on the user's use of the system and method of user interface and data entry from a video call, as described herein. The exemplary method can be divided into four stages:

Stage 1: The call is initiated 801 by the user. For example, a user of 3G cellular device performs a video call, or initiates an SIP video session while using a PC or PDA connected to the Internet.

Stage 2: The recognition is executed 802. The recognition stage comprises three operations:

Operation 1: Recognition is initiated 802*a* by the user. The user can use the device's keypad, voice command, or zoom on an object, such as alphanumerical code.

Operation 2: Recognition is performed 802*b* by the computational facility. To this end the techniques described in exemplary embodiments of the present invention are used. Optionally, some other related art techniques of pattern recognition, voice recognition, dialing on keypad and handwriting recognition can be used.

Operation 3: Criteria are applied 802c on the computational facility for any of a number of various purposes, including, for example, the following purposes:
Purpose 1: User identification
Purpose 2: User data entry
Purpose 3: Interactive communication with the user
Purpose 4: Coupons and discounts activation
Purpose 5: Hotlinks and favorites activation
Purpose 6: Viewing a Web page (or part of it) through the video call, by imaging a URL or graphic symbol.

Stage 3: Service is executed 803, comprising the following operations:

Operation 1: Service is initiated 803*a* based on information such as user identification information, credit history, coupons and discounts, hotlinks and favorites information.

Operations 2 and 3: The service is performed or provided 803*b* to the user, customized to the specific user data and profile. If additional user input is required, additional recognition stages are executed without disconnection of the service. Criteria are applied 803*c* to customize the service to the user (e.g., premium content, special discounts, customized GUI) and to collect billing information. Additional criteria are applied to store user information and statistics for other uses, such as polls, site ratings, usage habits, search engine maintenance.

Stage 4: The bill is generated 804 based on the recognition and service criteria such as video call minutes used, or data processed, or number of frames processed, or number of artifacts removed, on number of transactions executed, or use of coupons, or services/content provided. Optionally, the bill can be sent to the user at each service completion without discontinuing the call. Accordingly, the user is charged based on this exemplary, non-limiting billing method.

The foregoing description of the aspects of the exemplary embodiments of the present invention has been presented for purposes of illustration and description. It is not intended to be exhaustive or to limit the present invention to the precise form disclosed and modifications and variations are possible in light of the above teachings or may be acquired from practice of the present invention. The principles of the exemplary embodiments of the present invention and their practical applications were described in order to explain and to enable one skilled in the art to utilize the present invention in various embodiments and with various modifications as are suited to the particular use contemplated. Thus, while only certain aspects of the present invention have been specifically described herein, it will be apparent that numerous modifications may be made thereto without departing from the spirit and scope of the present invention.

What is claimed is:

1. A method for imaging an object, and using reference templates to recognize and enhance object images, during a video call, the method comprising:
   establishing a video call link via a communication network between a user interface unit and a computational facility;
   using a camera on the user interface unit to image plurality of images of the target object;
   transmitting the plurality of images of the target object from the user interface unit via the communication network to the computational facility;
   the computational facility identifying a template for a specific area of a target object to which images of the object are to be compared;
   computational facility comparing the plurality of images of the object to the template;
   the computational facility identifying an image from the comparison of the plurality images to the template;
   a storage facility storing the template and the identified image in a storage unit;
   repeating operations comprising said identifying of the template, said using of the camera, said comparing the plurality of images, said identifying the image, and said storing, to identify and store a multiplicity of templates in which each template applies to a specific area of the target object;
   comparing each of a multiplicity of images of the target object to the template applicable to the area of the imaged object in which the image is located;
   storing each compared image and corresponding template in the storage unit; and
   transmitting from the computational facility via the communication network to the user interface unit, instructions for actions to be taken by the user that allow transmission from the user interface unit to the computational facility additional images that improve the quality of the computational facility's recognition of the target object;
   wherein the foregoing operations are reiterated to enhance identification of the target object;
   using the camera of a wireless device to capture multiple images of each area of the target object; in which said multiple images in an area are on substantially same size scale and in which a substantial pictorial overlap among the images in an area is present;
   applying a technique to combine said multiple images of an area of the target object into a recognizable form; and
   storing results of said technique in the storage unit.

2. The method of claim 1, wherein said technique is selected from a group comprising optical character recognition, optical mark recognition, barcode recognition, alphanumeric data detection, logo and graphical symbols recognition, face recognition, and recognition of special marks.

3. The method of claim 1, wherein said technique is frame combination.

4. The method of claim 1, wherein said technique is projective geometric transform.

5. The method of claim 1, wherein a user communicates the selection of captured images of the target object to the storage unit using keypress the wireless device conveyed as Dual-Tone Multi-Frequency (DTMF) commands.

6. The method of claim 1, wherein a user selects the area imaged by zooming the camera with a forward movement on the center of the area of interest.

7. The method of claim 1, wherein the user identifies the area of interest by voice command.

8. The method of claim 1, further comprising:
   recognizing that some of the images taken of the target object are damaged so that such images convey incorrect or misleading information;
   comparing frames to templates to identify each damaged frame;
   discarding a fixed number of frames after each damaged frame, in which the fixed number of frames is approximately 10 or less.

9. The method of claim 1, in which the user is financially charged for using the service of identification, recognition, and enhancement of target objects.

10. The method of claim 9, in which the charge to user is based on one or more of the group comprising time and quantity of air time transmission and reception, time and quantity of data transmitted and received, and quantity of data processed by the server.

11. The method of claim 1, further comprising:
    said computational facility transmits feedback to a user during or very soon after the imaging executed by the server;
    said feedback contains suggestions to the user for actions that enhance effectiveness of images captured by the user.

12. The method of claim 11, in which said feedback is in a form of written instructions advising the new user to reposition or refocus the camera in the wireless device.

13. The method of claim 11, in which said feedback is image captured by the user, processed by the server, and transmitted back to a user's imaging device.

14. The method of claim 11, in which said feedback is in a form of voice instructions advising the user to reposition or refocus the camera in the wireless device.

15. The method of claim 11, in which the feedback is in a form of a visual clue suggesting to the user what should be done to reposition of refocus the camera in the wireless device.

16. The method of claim 1, wherein the communication network is a wireless network.

17. The method of claim 1, wherein the communication network is a wireline network.

18. The method of claim 1, wherein said operations are applied to at least one of services selected from the group composed of user identification, user data entry, interactive communication between the user and the computational facility, activation of coupons, activation of discounts, creation of hotliniks or activation of favorites on a favorite list, an viewing a Web page.

* * * * *